US011137511B2

(12) United States Patent
Yang et al.

(10) Patent No.: US 11,137,511 B2
(45) Date of Patent: Oct. 5, 2021

(54) ACTIVE SOURCE SURFACE WAVE PROSPECTING METHOD, SURFACE WAVE EXPLORATION DEVICE AND COMPUTER-READABLE STORAGE MEDIUM

(71) Applicant: SOUTHERN UNIVERSITY OF SCIENCE AND TECHNOLOGY, Guangdong (CN)

(72) Inventors: Zhentao Yang, Guangdong (CN); Xiaofei Chen, Guangdong (CN); Jiannan Wang, Guangdong (CN); Lei Pan, Guangdong (CN)

(73) Assignee: SOUTHERN UNIVERSITY OF SCIENCE AND TECHNOLOGY, Guangdong (CN)

( * ) Notice: Subject to any disclaimer, the term of this patent is extended or adjusted under 35 U.S.C. 154(b) by 0 days.

(21) Appl. No.: 17/051,247

(22) PCT Filed: Aug. 6, 2018

(86) PCT No.: PCT/CN2018/098980
§ 371 (c)(1),
(2) Date: Oct. 28, 2020

(87) PCT Pub. No.: WO2020/029015
PCT Pub. Date: Feb. 13, 2020

(65) Prior Publication Data
US 2021/0141113 A1 May 13, 2021

(51) Int. Cl.
*G01V 1/34* (2006.01)
*G01V 1/28* (2006.01)
(Continued)

(52) U.S. Cl.
CPC ............. *G01V 1/34* (2013.01); *G01V 1/282* (2013.01); *G01V 1/307* (2013.01); *G01V 1/32* (2013.01)

(58) Field of Classification Search
USPC ............................................. 702/16
See application file for complete search history.

(56) References Cited

U.S. PATENT DOCUMENTS

2011/0120724 A1* 5/2011 Krohn ............... G01V 1/30
166/369
2014/0236487 A1* 8/2014 Kimman ............. G01V 1/288
702/18
(Continued)

FOREIGN PATENT DOCUMENTS

CN 104678435 A 6/2015
CN 104730579 A 6/2015
(Continued)

*Primary Examiner* — Paul D Lee
(74) *Attorney, Agent, or Firm* — Muncy, Geissler, Olds & Lowe, P.C.

(57) ABSTRACT

Active source surface wave prospecting method which is applicable to technical field of geological prospecting, comprising: collecting, by detector at preset station, surface wave data transmitted from seismic source; calculating to obtain dispersion energy graph on basis of vector wavenumber transformational algorithm and according to surface wave data; extracting dispersion curve from dispersion energy graph, dispersion comprising base-order surface wave dispersion curve and high-order surface wave dispersion curve; establishing initial stratigraphic model according to base-order surface wave dispersion curve and high-order surface wave dispersion curve, performing, according to initial stratigraphic model, joint inversion on base-order surface wave dispersion curve and high-order surface wave dispersion curve to obtain inverting data of stratigraphic texture. Accuracy of surface wave prospecting result is (Continued)

effectively improved. Further provided are surface wave exploration device and terminal device.

14 Claims, 5 Drawing Sheets

(51) Int. Cl.
*G01V 1/30* (2006.01)
*G01V 1/32* (2006.01)

(56) References Cited

U.S. PATENT DOCUMENTS

2016/0341839 A1* 11/2016 Kazinnik ............... G01V 1/28
2017/0343690 A1* 11/2017 Duret ................... G01V 1/36
2018/0100947 A1    4/2018 Hajiani et al.

FOREIGN PATENT DOCUMENTS

| CN | 106772575 A | 5/2017 |
|----|----|----|
| CN | 106950599 A | 7/2017 |
| WO | WO2016187252 A1 | 11/2016 |

* cited by examiner

ACTIVE SOURCE SURFACE WAVE PROSPECTING METHOD, SURFACE WAVE EXPLORATION DEVICE AND COMPUTER-READABLE STORAGE MEDIUM

CROSS-REFERENCES TO RELATED APPLICATIONS

This application is a national stage application of PCT Patent Application No. PCT/CN 2018/098980, filed on Jun. 8, 2018, the content of all of which is incorporated herein by reference.

FIELD OF THE INVENTION

The present application relates to the technical field of geological prospecting, and, more particularly, to an active source surface wave prospecting method, a surface wave prospecting device, a terminal device and a computer-readable storage medium.

BACKGROUND

A surface wave is a special type of a seismic wave, which is generated by mutually interfering and overlapping P wave(primary wave) and shear wave after a plurality of complicated reflection and transmission at each interface in a seismic source region. The surface wave has carried a large plurality of stratigraphic information during a propagation process, and presented a characteristic of dispersion, which is also able to indirectly reflect a plurality of inherent characteristics of a layered medium itself. Therefore, an active source surface wave (i.e. artificial source surface wave) is usually applied to prospecting a stratigraphic structure.

However, in the prior art, when applying the active source surface wave to prospecting the stratigraphic structure, it requires an observation system and the seismic source to be linearly arranged, while requiring a plurality of wave detectors to be placed at an equal interval. While in a complex urban area, a construction condition mentioned above is often hard to meet, and even if a construction is barely started, it is still impossible to obtain a surface wave prospecting image in a high-resolution, therefore it is impossible to obtain an accurate prospecting result of the stratigraphic structure.

Technical Problem

In view of this, an embodiment of the present application provides an active source surface wave prospecting method, a surface wave prospecting device, a terminal device and a computer-readable storage medium, in order to solve a problem in the prior art that a surface wave prospecting result is inaccurate.

BRIEF SUMMARY OF THE APPLICATION

A first aspect of a plurality of embodiments in the present application provides an active source surface wave prospecting method, comprising:
collecting surface wave data propagated from a seismic source through a wave detector at a preset station;
calculating and obtaining a dispersion energy graph based on a vector wavenumber transform algorithm and the surface wave data;
extracting dispersion curves from the dispersion energy graph comprising a fundamental mode surface wave dispersion curve and a higher mode surface wave dispersion curve;
establishing an initial stratigraphic model according to the fundamental mode surface wave dispersion curve and the higher mode surface wave dispersion curve, and performing a joint inversion to the fundamental mode surface wave dispersion curve and the higher mode surface wave dispersion curve according to the initial stratigraphic model, before obtaining inversion data of a stratigraphic structure.

A second aspect of the embodiments in the present application provides an surface wave prospecting device, comprising:
a collection unit, applied to collecting surface wave data propagated from a seismic source through a wave detector at a preset station;
a calculation unit, applied to calculating and obtaining a dispersion energy graph based on a vector wavenumber transform algorithm and the surface wave data;
an extraction unit, applied to extracting a dispersion curve from the dispersion energy graph comprising a fundamental mode surface wave dispersion curve and a higher mode surface wave dispersion curve;
an inversion unit, applied to establishing an initial stratigraphic model according to the fundamental mode surface wave dispersion curve and the higher mode surface wave dispersion curve, and performing a joint inversion to the fundamental mode surface wave dispersion curve and the higher mode surface wave dispersion curve according to the initial stratigraphic model, before obtaining an inversion data of the stratigraphic structure.

A third aspect of the embodiments in the present application provides a terminal device comprising a memory, a processor, and a computer program stored in the memory and executed on the processor, the processor executes the computer program and achieves a plurality of steps of the method provided in the first aspect of the embodiment in the present application.

A fourth aspect of the embodiments in the present application provides a computer-readable storage medium, the computer-readable storage medium has a computer program stored, and when the computer program is executed by one or more processors, the steps of the method provided in the first aspect of the embodiments in the present application are achieved.

Advantageous Effects

The embodiments in the present application, by the wave detectors at the preset stations collecting the surface wave data propagated from the seismic source, are possible to arrange a plurality of collection devices arbitrarily, which reduces a requirement for a layout site and improves an adaptability of a prospecting site for the surface wave. By using an extracted dispersion curve to establish the initial stratigraphic model, a calculation time of an inversion calculation is reduced; followed by performing a joint inversion to the fundamental mode surface wave dispersion curve and the higher mode surface wave dispersion curve according to the initial stratigraphic model, before adding higher mode surface wave dispersion information to the inversion calculation of the stratum, thereby reducing an uncertainty of the inversion calculation and improving a robustness of the inversion calculation.

BRIEF DESCRIPTION OF THE DRAWINGS

In order to illustrate the technical solutions in the embodiments of the present application more clearly, a plurality of drawings needed when describing the embodiments or the prior art are briefly introduced herein. Obviously, the drawings described below are only some embodiments in the present application, for those skilled in the art, without any creative labors, other drawings may be obtained based on these drawings.

DETAILED DESCRIPTION OF EMBODIMENTS

In the following description, for a purpose of illustration rather than limitation, a plurality of specific details including a specific system structure and technology are proposed for a thorough understanding of a plurality of embodiments of the present application. However, those skilled in the art should be clear that the present application can also be implemented in a plurality of other embodiments without these specific details. In other cases, detailed descriptions of well-known systems, devices, circuits, and methods are omitted to avoid any unnecessary details from obstructing the description of the present application.

It should be understood that when used in the present specification and appended claims, the term "comprising" indicates an existence of a plurality of described features, wholes, steps, operations, elements, and/or components, without excluding an existence or addition of one or more other features, wholes, steps, operations, elements, components, and/or a collection thereof.

It should also be understood that the terms used in the specifications of the present application are only for a purpose of describing a plurality of specific embodiments, instead of limiting the application. As used in the specifications and the appended claims of the present application, unless other circumstances have been clearly indicated by the context, the singular forms of "a", "an" and "the" are intended to include plural forms.

It should be further understood that the term "and/or" used in the specifications and appended claims of the present application, refers to any combination of one or more of the associated items listed and all possible combinations, while these combinations are included.

As used in the specifications and the appended claims, the term "if" can be interpreted as "when" or "once" or "in response to determination" or "in response to detection" depending on the context. Similarly, the phrase "if determined" or "if detected [described condition or event]" can be construed to mean "once determined" or "in response to determination" or "once detected [described condition or event]" or "in response to the detection of [condition or event described]".

In order to illustrate the technical solution described in the present application, specific embodiments are used for descriptions below.

Figure 1:
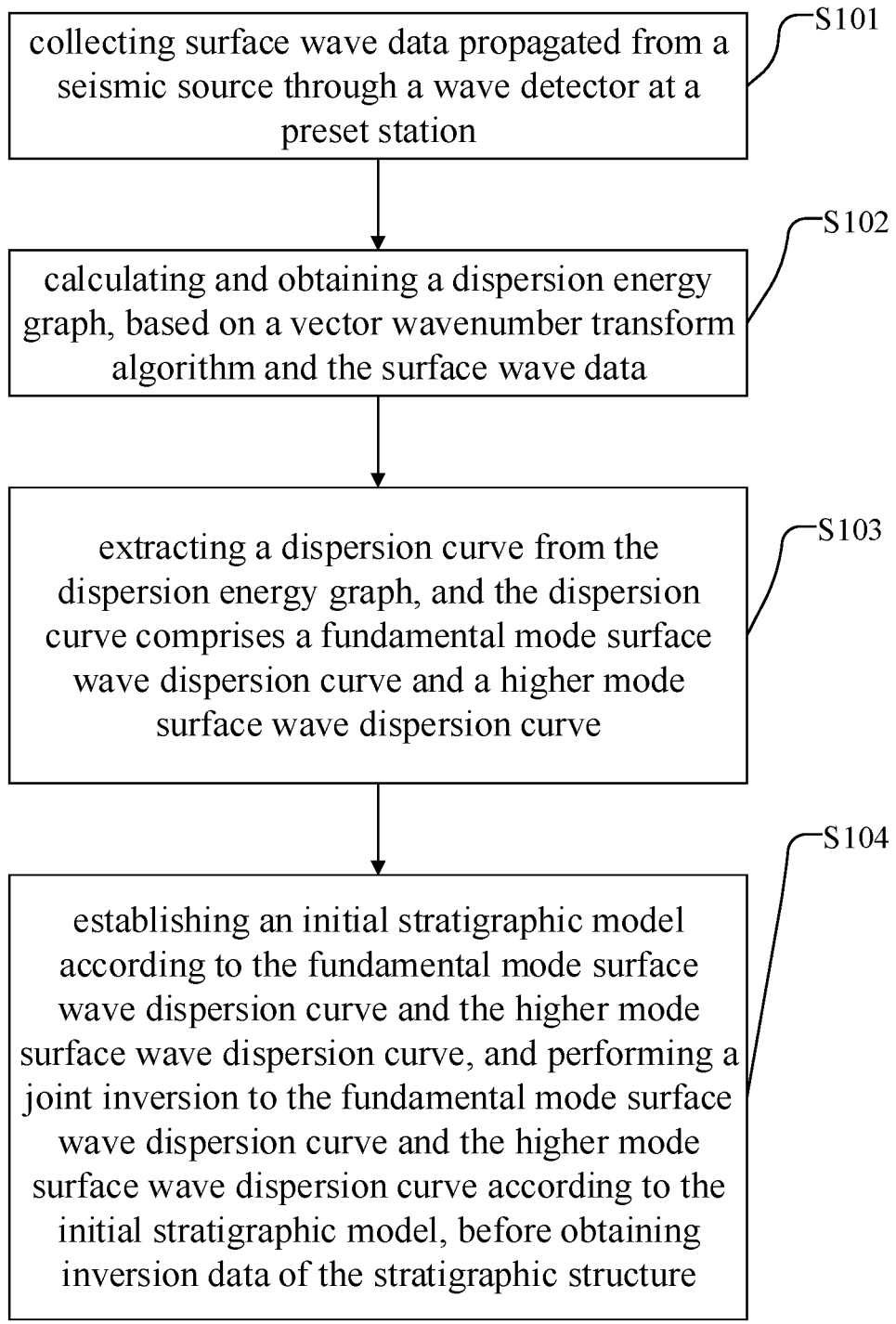
FIG. 1 illustrates a schematic diagram on an implementation flow chart of an active source surface wave prospecting method provided by an embodiment in the present application.

FIG. 1 illustrates a schematic diagram on an implementation flow chart of an active source surface wave prospecting method provided by the embodiment in the present application, shown as the figure, the method comprises a plurality of following steps:

Step S101, collecting surface wave data propagated from a seismic source through a wave detector at a preset station.

In a real practice, a device applied to collecting the surface wave data propagated from the seismic source comprises but not limited to the wave detector, both a multi-channel wired engineering seismic device and an independent wireless seismic device may be adopted. Preferably, the wave detector may be a wideband wave detector with a basic frequency no higher than 4 Hz. The faster an acquisition bandwidth is, the better an acquisition of the surface waves in various frequencies is. A number of the wave detectors is greater than or equal to a preset number, for example the number of the wave detectors is greater than or equal to 12. A sampling frequency of the wave detector shall meet a prospecting purpose, and an engineering prospecting sampling rate is generally no less than 200 Hz. In addition, the preset stations are artificially preset, with a wave detector placed at each preset station.

Wherein, the surface wave is one kind of seismic wave, which mainly propagates on the earth surface, having a largest energy, with a wave velocity about 3.8 km/s, lower than a body wave, which is often recorded at last. The surface wave is actually a secondary wave derived from the body wave on the earth surface. A propagation of the surface wave is pretty complicated, being able to cause the earth surface up and down, or cause the earth surface to make a shearing movement transversely. Wherein, the shearing movement damages a building most strongly. The surface wave comprises a Rayleigh wave, a Love wave, a hydraulic wave, a Stoneley wave and more. However, it is found by research that a phase velocity of the Rayleigh wave in a layered medium changes with the frequency, showing an obvious dispersion characteristic. The Rayleigh wave in a horizontally layered medium is generated by mutually interfering and overlapping of both P waves and shear waves after a plurality of complicated reflections and transmissions at each interface in a seismic source region, which carries a plurality of parameter information of medium in various layers comprising a P-wave velocity, an S-wave velocity, a density and more, and the velocity mainly depends on a distribution of the S-wave velocity in the layered medium. A variation characteristic of both energy and velocity of the Rayleigh wave in a propagation process has carried a large amount of information about an underground stratum, and a dispersion characteristic presented, has also indicated indirectly a plurality of inherent characteristics of a layered medium itself. Therefore, studying a dispersion of a low-frequency Rayleigh wave in a natural seismic wave can solve a problem of a deep geological structure; studying a higher-frequency Rayleigh wave generated by an active seismic source can solve a plurality of shallow geology problems including an engineering prospection, a site and foundation treatment evaluation, an obstacle and cavity detection and more. Therefore, the Rayleigh wave is preferably applied in the embodiments of the present application.

Step S102, calculating and obtaining a dispersion energy graph, based on a vector wavenumber transform algorithm and the surface wave data.

Using the vector wavenumber transform algorithm, the wave detectors at the preset stations may be placed without following a preset rule (in the prior art, it requires both the wave detectors and the seismic sources are linearly arranged and placed at an equal interval), which has decreased a construction difficulty and increased a construction site adaptability.

Figure 2:
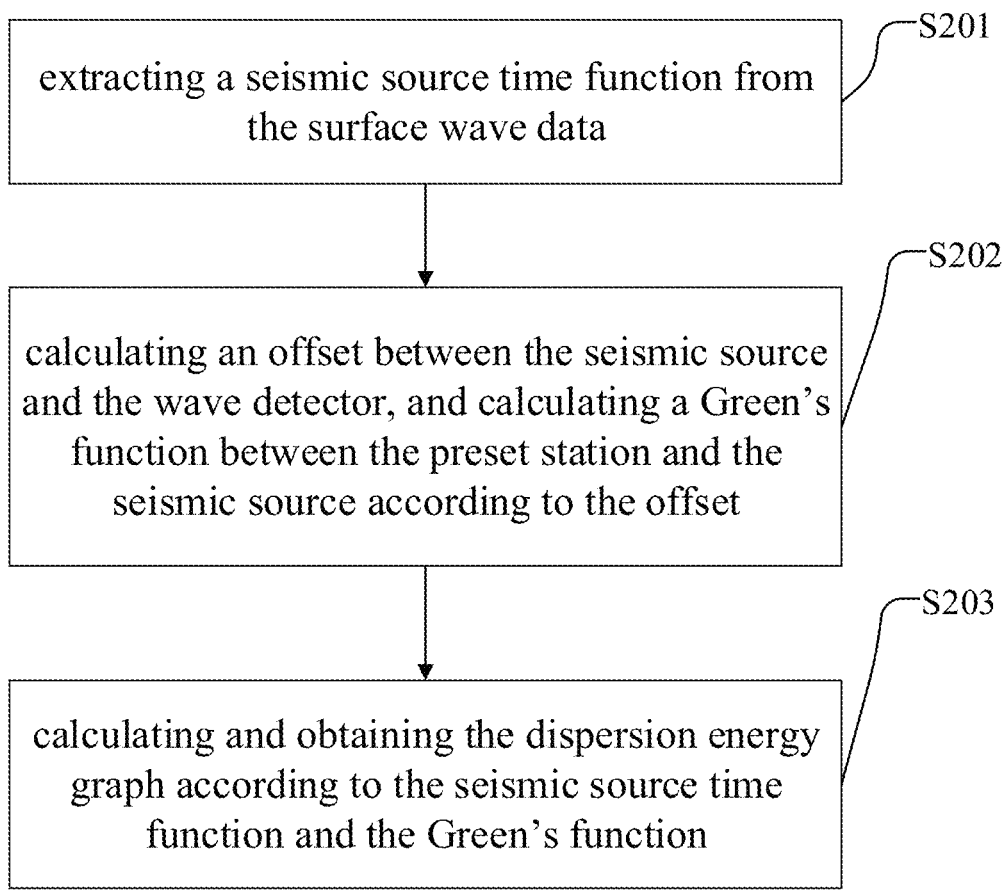
FIG. 2 illustrates a schematic diagram on an implementation flow chart of calculating a dispersion energy graph in the active source surface wave prospecting method provided by the embodiment in the present application.

For a plurality of specific implementation steps of the step S102, may refer to the description in the embodiment of FIG. 2.

Step S103, extracting a dispersion curve from the dispersion energy graph, and the dispersion curve comprises a fundamental mode surface wave dispersion curve and a higher mode surface wave dispersion curve.

An actual received background noise data comprises a plurality of waves generated by various vibrations, including not only surface waves, but also body waves. Moreover, the surface wave will have a dispersion phenomenon in an inhomogeneous medium, that is, the surface wave is composed of a plurality of modes with different phase velocities. A large number of studies have proved that, a higher mode surface wave part in a dispersion curve plays a key role in an inversion analysis of the stratigraphic structure. Using the vector wavenumber transformation algorithm in the embodiments of the application, the dispersion energy graph calculated may effectively separate a plurality of components including the surface waves of different velocities (that is, the fundamental mode surface waves and the higher mode surface waves can be separated) and the body waves.

Step S104, establishing an initial stratigraphic model according to the fundamental mode surface wave dispersion curve and the higher mode surface wave dispersion curve, and performing a joint inversion to the fundamental mode surface wave dispersion curve and the higher mode surface wave dispersion curve according to the initial stratigraphic model, before obtaining inversion data of the stratigraphic structure.

In the prior art, the active source surface wave prospecting method in an engineering application only inverts a depth and a thickness of the stratum according to a zigzag characteristic of the dispersion curve, after connecting the dispersion curve manually or automatically according to maximum value of the energy. An inversion method stated above must have an accurate judgment on an order of the higher mode surface wave. However, when there is a low-velocity layer or a high-velocity layer in the stratum, not only an energy distribution of each mode of the Rayleigh wave will change, but the velocity of each mode will also change following a change of the frequency, which often results in a "mode kissing" phenomenon, this will bring a great difficulty to a judgment of the higher mode dispersion curves. Moreover, when there is a weak intercalated layer existing in a horizontally layered stratigraphic model in a high frequency range, the higher mode surface waves have greater energy than the fundamental mode surface waves, which means that there is no way to obtain the fundamental mode surface waves within a certain frequency range by a current method, instead, only higher mode surface waves can be obtained. In an actual prospection, a real stratum is not an ideal horizontally layered isotropic structure, which results in a normally low imaging quality of the Rayleigh waves in the higher mode of dispersion graph waves. All the factors listed above have limited the use of the higher mode dispersion curve for an inversion.

Study has found that when there are low-velocity or high-velocity intercalated layer in the stratum, an energy of the Rayleigh wave in a frequency range corresponding to burial depth of the intercalated layer has a step change from the fundamental mode to a first mode or a higher mode, resulting in an appearance of both the fundamental mode and the higher mode surface wave dispersion curves are consecutive in a certain frequency range only, while for an actual data, the imaging quality may be worse. Thus in the dispersion energy graph, a distribution of the energy in each mode is also closely related to the stratum structure. In the present embodiment, the frequency range is classified according to a relationship between the energy distributions of each mode in each different frequency ranges in the dispersion energy graph, so as to quickly establish a simple layered stratigraphic model which is an initial model for a subsequent accurate inversion.

In addition, in the present embodiment, a plurality of inversion algorithms including a simulated annealing algorithm, a genetic algorithm and more can be adopted to inverting the dispersion curves, before obtaining a plurality of stratum information and/or a velocity information of a vibration wave. For example, it is possible to obtain both a stratum depth information and a velocity profile to realize a prospection of the stratum structure; wherein the stratum information may comprise a stratum depth, an S wave velocity, a density, a P wave velocity, and more.

In the embodiment of the present application, the establishing an initial stratigraphic model according to the fundamental mode surface wave dispersion curve and the higher mode surface wave dispersion curve, comprising:

classifying the frequency ranges according to the energy distribution of the surface wave modes in each frequency range in the fundamental mode surface wave dispersion curve and the higher mode surface wave dispersion curve;

establishing the initial stratigraphic model according to a correspondence relationship between the classified frequency ranges and the stratum.

Figure 5:
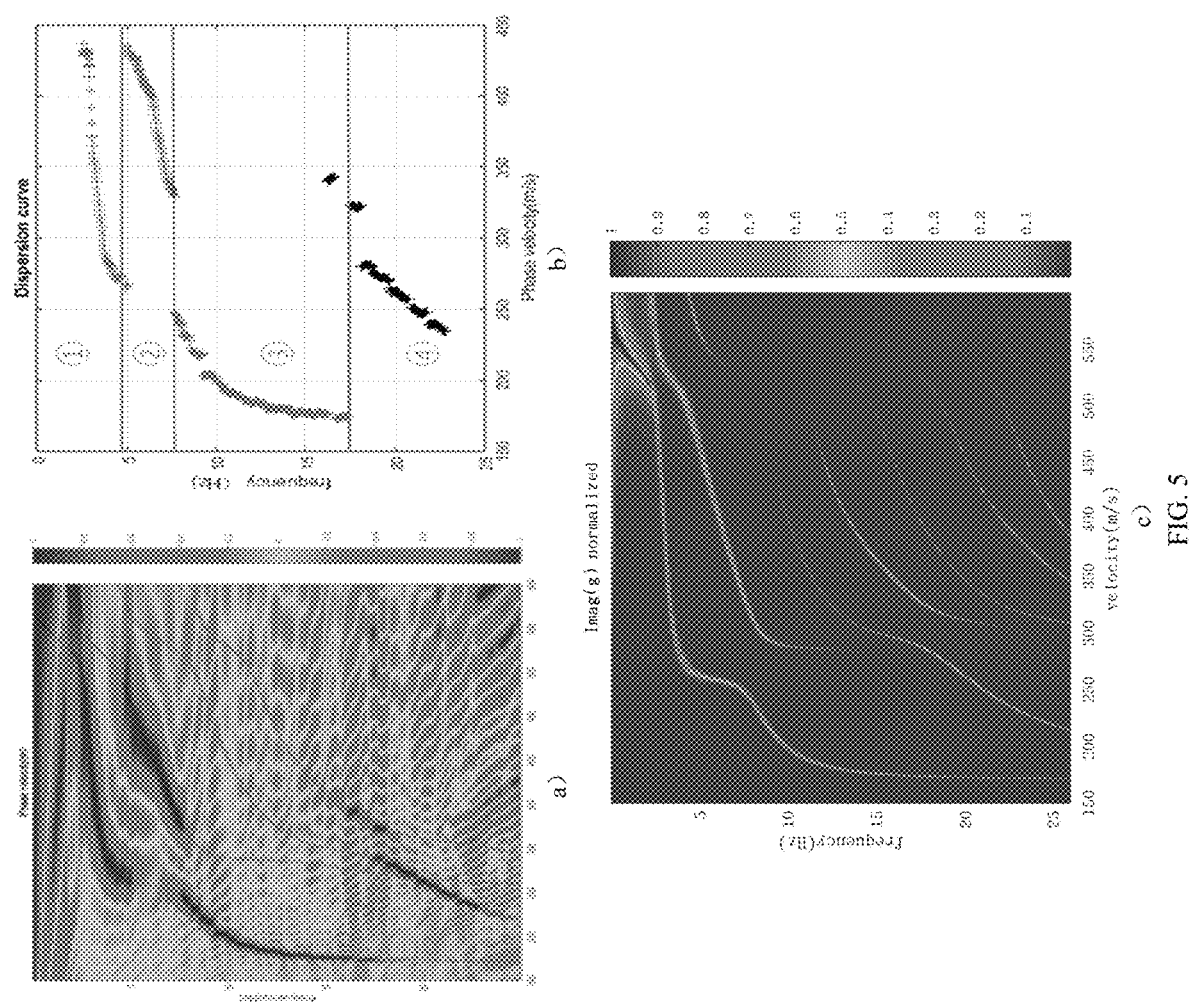
FIG. 5 illustrates a schematic diagram on an extracted F-C dispersion graph (a), a frequency range classification (b), and a theoretical F-C dispersion graph (c) obtained by a kernel function of a Green's function provided by the embodiment in the present application.

Shown as FIG. 5, wherein FIG. 5a) illustrates an F-C dispersion energy graph, wherein a dotted line is a theoretical surface wave dispersion curve; FIG. 5b) illustrates a plurality of discrete dispersion points extracted according to the dispersion energy, and classify the frequency ranges into 4 categories according to a distribution characteristic; FIG. 5c) illustrates a theoretical F-C dispersion energy graph obtained by a kernel function of a Green's function.

Figure 6:
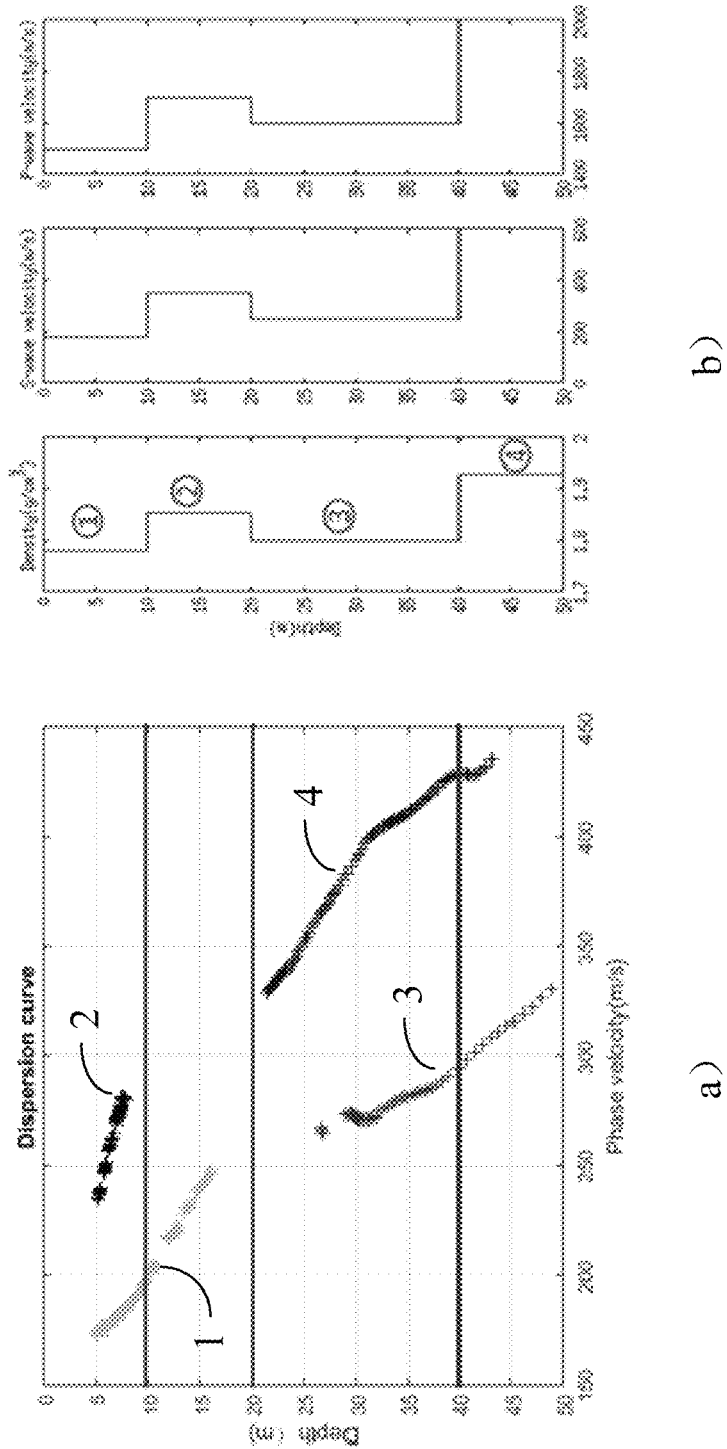
FIG. 6 illustrates a schematic diagram on a dispersion graph and a stratigraphic model in a depth domain provided by the embodiment in the present application.

Converting the dispersion points in a frequency-velocity domain into a depth-velocity domain according to a half-wavelength theory is shown as FIG. 6. FIG. 6a) is a dispersion energy graph in the depth domain, and FIG. 6b) is the stratigraphic model. It can be seen that, on the dispersion energy graph, the points on No. 1 dotted line and No. 3 dotted line are the points on the fundamental mode dispersion curve, and the points on No. 2 dotted line and No. 4 dotted line are the points on the higher mode dispersion curve. Comparing the stratigraphic model with the dispersion curve obtained in the depth domain, it can be seen that the third layer (a low-velocity layer) with a burial depth of displacement 20-40 m is basically as same as a distribution of dispersion points of No. 4 in the depth-velocity profile; while a distribution of a first layer with a displacement 0-10 m is also basically as same as a distribution of dispersion points of No. 2 in the depth-velocity profile. Thus we can see that there is indeed a one-to-one correspondence relationship between the distribution of the higher mode dispersion curves and the stratum. It has proved that, an idea of classifying the dispersion points in a frequency domain, delaminating the stratum, and establishing the initial model is correct.

In the embodiments of the present application, by the wave detector at the preset station collecting the surface wave data propagated from the seismic source, it is possible to arrange a plurality of collection devices arbitrarily, which reduces a requirement for a layout site and improves an adaptability of a prospecting site for the surface wave. By using an extracted dispersion curve to establish the initial stratigraphic model, a calculation time of an inversion calculation is reduced; followed by performing a joint inversion to the fundamental mode surface wave dispersion curve and the higher mode surface wave dispersion curve according to the initial stratigraphic model, before adding an higher mode surface wave dispersion information to the inversion calculation of the stratum, thereby reducing an uncertainty of the inversion calculation and improving a robustness of the inversion calculation.

FIG. 2 illustrates a schematic diagram on an implementation flow chart of calculating a dispersion energy graph in the active source surface wave prospecting method provided by the embodiment in the present application. Shown as the figure, the step S102 in the embodiment shown in FIG. 1 may comprise a plurality of following steps:

Step S201, extracting a seismic source time function from the surface wave data.

In a real application, there are methods to extract the seismic source time function. In the embodiment, the seismic source time function may be approximated to a Ricker wavelet directly; or the seismic source time function may also be extracted from a plurality of seismic records according to a correlation. It is available as long as the seismic source time function can be extracted, without any limitations to an extraction method.

Step S202, calculating an offset between the seismic source and the wave detector, and calculating a Green's function between the preset station and the seismic source according to the offset.

wherein, the offset is a distance between the seismic source and the wave detector. Because the wave detector is installed at the preset station, the offset may also be considered as a distance between the preset station and the seismic source. In a calculation formula, it is possible to use $g_{zz}$ to represent the Green's function between the z component of preset station and the z component of seismic source.

Step S203, calculating and obtaining the dispersion energy graph according to the seismic source time function and the Green's function.

In the embodiment of the present application, step S203 further comprising:

performing a convolution process to the seismic source time function and the Green's function, and obtaining vertical component data in a time domain of the surface wave data at the preset station.

wherein, the vertical component data in the time domain is:

$u_z(x,t) = f_0(t) * g_{zz}(x,t)$ wherein, $u_z(x, t)$ represents the vertical component data, $f_0$ represents the seismic source time function, represents the Green's function;

performing a Fourier transform on the vertical component data in the time domain to obtain a vertical component data in the frequency domain;

wherein, the vertical component data in the frequency domain is:

$U(r,\omega) = F_0(\omega) G(r,\omega)$ wherein, U represents the vertical component data in the frequency domain, $r = |\vec{r}|$ represents a distance between two observing stations (as preset stations) $\omega$ represents an angular frequency, $\omega = 2\pi f$, $f$ is the frequency, $F_0$ is the seismic source time function in the frequency domain, G is the Green's function in the frequency domain, $G(r, \omega) = \int_0^{+\infty} g(\omega, k) J_0(kr) k dk$, $g(\omega, k)$ is the kernel function, $k = \vec{k}$ is a wavenumber, $J_0(kr)$ is a first kind of Bessel function of zeroth order;

performing a vector wavenumber transformation on the vertical component data in the frequency domain to obtain the dispersion energy graph.

In the embodiment of the present application, the step of performing a vector wavenumber transformation on the vertical component data in the frequency domain to obtain the dispersion energy graph, further comprises:

performing a vector wavenumber transformation on the vertical component data in the frequency domain to obtain an intermediate calculation formula;

converting the intermediate calculation formula into a final calculation formula, based on an orthogonal nature of the Bessel function;

calculating and obtaining the dispersion energy graph, based on the final calculation formula.

In a real application, when the seismic source time function is the Ricker wavelet, $F_0(\omega)$ in the frequency domain is a pure real number function, that means, a spectral function of the surface wave data received by the preset station is approximately an imaginary part of the Green's function, with a difference in an amplitude only:

$U(r,\omega) = A \cdot \{G(r,\omega)\}$ wherein, $A = F_0(\omega)$ is a constant. Performing a vector wavenumber transform on a vertical component data U in the frequency domain, obtaining:

$\int_0^{+\infty} U(r,\omega) J_0(kr) r dr = A \int_0^{+\infty} G(r,\omega) J_0(kr) r dr.$ Substituting $G(r, \omega) = \int_0^{+\infty} g(\omega, k) J_0(kr) k dk$ into the formula above, obtaining the intermediate calculation formula as:

$\int_0^{+\infty} U(r,\omega) J_0(kr) r dr = F_0(\omega) \int_0^{+\infty} \int_0^{+\infty} g(\omega,k') J_0(kr) k' r dk' dr.$ According to an orthogonality of the Bessel function $$\int_0^{+\infty} J_0(kr) J_0(k'r) r dr = \frac{1}{\sqrt{kk'}} \delta(k-k'),$$

the formula above may be reduced to obtain the final calculation formula:

$\int_0^{+\infty} U(r,\omega) J_0(kr) r dr = F_0(\omega) \cdot g(\omega,k)$

Wherein the kernel function $g(\omega, k)$ owns a character as below: a value of the $g(\omega, k)$ is inversely proportional to a value of a duration function that determines the dispersion character of the surface wave, that is $$g(k, \omega) \propto \frac{1}{\det\{I - \hat{R}_{du}^{(1)}(k, \omega) \hat{R}_{ud}^{(0)}(k, \omega)\}}$$

wherein, $$g(k,\omega) \propto \frac{1}{\det\{I - \hat{R}_{du}^{(1)}(k,\omega)\hat{R}_{ud}^{(0)}(k,\omega)\}},$$

$R_{du}$ represents a reflection coefficient matrix of a downstream wave, $R_{ud}$ represents a reflection coefficient matrix of an upstream wave, I is a unit matrix, det{ } is a matrix determinant. When $k=k_{n(\omega)(n=1, 2, 3, \ldots)}$ is a pole of the kernel function $g(\omega, k)$, the value of the kernel function diverges to infinity. By using this property, a Vector Wavenumber Transform Method (VW™) is proposed to extract the dispersion curve.

Based on the final calculation formula described above, it is possible to calculate and obtain the dispersion energy graph.

The embodiment of the present application have proposed a vector wavenumber transformation algorithm, and a dispersion energy graph is calculated based on the vector wave number transformation algorithm and the surface wave data. In the dispersion energy graph obtained from the above method, it is able to effectively separate the surface waves in different velocity, that is, the fundamental mode surface wave dispersion curve and the higher mode surface wave dispersion curve. In addition, by adopting the vector wavenumber transform algorithm, the preset stations do not have to be placed according to a certain rule, instead, they can be placed arbitrarily, which has improved an adaptability of a surface wave propagation field.

It should be understood that, a value of the sequence number of each step in the embodiments stated above does not mean an order of execution, instead, an execution sequence of each process shall be determined by a function and an internal logic thereof, which shall not constitute any limitations on an implementation process of the embodiments of the present application.

Figure 3:
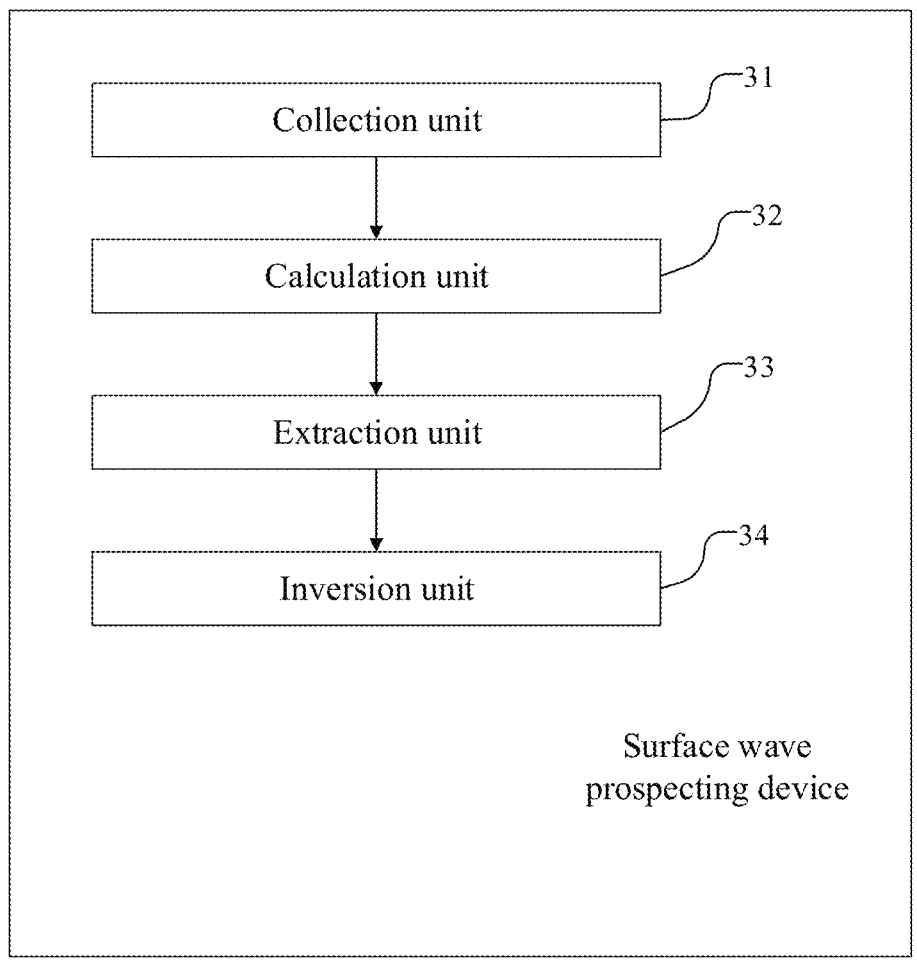
FIG. 3 illustrates a schematic diagram on a surface wave prospecting device provided by the embodiment in the present application.

FIG. 3 illustrates a schematic diagram on a surface wave prospecting device provided by the embodiment in the present application, in order for an easy description, only a part related to the embodiment in the present application is shown.

The surface wave prospecting device shown in FIG. 3 may be a software unit, a hardware unit, or a combination unit of both software and hardware built in an existing terminal device, or integrated into the terminal device as an independent pendant, or existing as an independent terminal device.

The surface wave prospecting device 3 comprises:

a collection unit 31, applied to collecting surface wave data propagated from a seismic source through a wave detector at a preset station;

a calculation unit 32, applied to calculating and obtaining a dispersion energy graph, based on a vector wavenumber transform algorithm and the surface wave data;

an extraction unit 33, applied to extracting a dispersion curve from the dispersion energy graph, and the dispersion curve comprises a fundamental mode surface wave dispersion curve and a higher mode surface wave dispersion curve.

an inversion unit 34, applied to establishing an initial stratigraphic model according to the fundamental mode surface wave dispersion curve and the higher mode surface wave dispersion curve, and performing a joint inversion to the fundamental mode surface wave dispersion curve and the higher mode surface wave dispersion curve according to the initial stratigraphic model, before obtaining inversion data of the stratigraphic structure.

Alternatively, the calculation unit 32 comprises:

an extraction subunit, applied to extracting the seismic source time function from the surface wave data;

a first calculation subunit, applied to calculating the offset between the seismic source and the wave detector, and calculating the Green's function between the preset station and the seismic source according to the offset.

a second calculation subunit, applied to calculating and obtaining the dispersion energy graph according to the seismic source time function and the Green's function.

Alternatively, the second calculation subunit comprises:

a convolution module, applied to performing a convolution process to the seismic source time function and the Green's function, and obtaining vertical component data in a time domain of the surface wave data at the preset station;

a first conversion module, applied to performing a Fourier transform on the vertical component data in the time domain to obtain the vertical component data in a frequency domain;

a result module, applied to performing a vector wavenumber transformation on the vertical component data in the frequency domain and obtaining the dispersion energy graph.

Alternatively, the result module comprises:

a transformation submodule, applied to performing a vector wavenumber transformation on the vertical component data in the frequency domain to obtain an intermediate calculation formula, after performing a vector wavenumber transformation on the vertical component data in the frequency domain and obtaining the dispersion energy graph;

a conversion submodule, applied to converting the intermediate calculation formula into a final calculation formula based on an orthogonal nature of the Bessel function;

a calculation submodule, applied to calculating and obtaining the dispersion energy graph, based on the final calculation formula.

wherein, the vertical component data in the time domain is:

$$u_z(x,t) = f_0(t) * g_{zz}(x,t)$$

wherein, $u_z(x, t)$ represents the vertical component data, $f_0$ represents the seismic source time function, $g_{zz}$ represents the Green's function.

The vertical component data in the frequency domain is:

$$U(r,\omega) = F_0(\omega)G(r,\omega)$$

wherein, U represents the vertical component data in the frequency domain, $r=|\bar{r}|$ represents a distance between two observing stations (preset stations), $\omega$ represents an angular frequency, $\omega=2\pi f$, $f$ is the frequency, $F_0$ is the seismic source time function in the frequency domain, G is the Green's function in the frequency domain, $G(r, \omega)=\int_0^{+\infty} g(\omega, k)J_0(kr)kdk$, $g(\omega, k)$ is the kernel function, $k=\bar{k}$ is a wavenumber, $J_0(kr)$ is a first kind of Bessel function of zeroth order.

The intermediate calculation formula is:

$$\int_0^{+\infty} U(r,\omega)J_0(kr)rdr = F_0(\omega)\int_0^{+\infty}\int_0^{+\infty} g(\omega,k')J_0(kr)k'rdk'dr.$$

The final calculation formula is:

$$\int_0^{+\infty} U(r,\omega)J_0(kr)rdr = F_0(\omega) \cdot g(\omega,k);$$

wherein, $$g(k, \omega) \propto \frac{1}{\det\{I - \hat{R}_{du}^{(1)}(k, \omega)\hat{R}_{ud}^{(0)}(k, \omega)\}},$$

$R_{du}$ represents a reflection coefficient matrix of a downstream wave, $R_{ud}$ represents a reflection coefficient matrix of an upstream wave, I is a unit matrix, det{ } is a matrix determinant.

Alternatively, the inversion unit 34 comprises:

a classification subunit, applied to classifying the frequency ranges according to the energy distribution of the surface wave modes in each frequency range in the fundamental mode surface wave dispersion curve and the higher mode surface wave dispersion curve;

an establishing subunit, applied to establishing the initial stratigraphic model according to a correspondence relationship between the frequency ranges after classification and the stratum.

Those skilled in the art can clearly understand that, for a convenience and a conciseness of the description, only a division of a plurality of functional units and modules stated above is used as an embodiment. In a real application, it is possible to allocate the functions stated above to a plurality of different functional units, modules to complete, that means dividing an internal structure of the device into different functional units or modules, to complete all or part of the functions described above. Each functional unit and module in the embodiments can be integrated into one processing unit, or each unit can exist physically alone, or two or more units can be integrated into one unit. An integrated unit mentioned above can be achieved by adopting a hardware format, or adopting a software format of functional units. In addition, a specific name of each functional unit and module is only for a convenience of distinguishing from each other, instead of limiting a protection scope of the present application. For a specific working process of the units and modules in the system described above, it is possible to refer to a plurality of corresponding processes in the embodiments of the method described above, which are not repeated herein.

Figure 4:
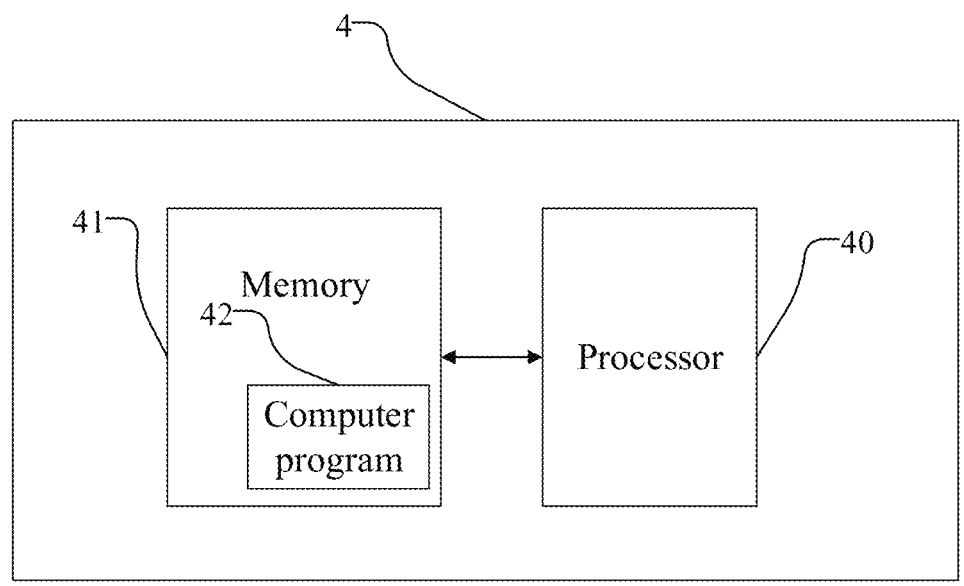
FIG. 4 illustrates a schematic diagram on a terminal device provided by the embodiment in the present application.

FIG. 4 illustrates a schematic diagram on a terminal device provided by the embodiment in the present application. As shown in FIG. 4, a terminal device 4 of the present embodiment comprises a processor 40, a memory 41, and a computer program 42 stored in the memory 41 and been able to run on the processor 40. The processor 40 executes the computer program 42, and achieves a plurality of steps in the embodiments in the active source surface wave prospecting method described above, including a plurality of steps of S101 to S104 as shown in FIG. 1. Alternatively, the processor 40 executes the computer program 42, and achieves the functions of each module/unit in each embodiment on the device described above, including the functions of the modules 31 to 34 shown in FIG. 3.

In an embodiment, the computer program 42 may be divided into one or more modules/units, and the one or more modules/units are stored in the memory 41 and executed by the processor 40 to complete the present application. The one or more modules/units may be a series of computer program command segments capable of completing a specific function, and the command segments are applied to describing an execution process of the computer program 42 in the terminal device 4. In the embodiment, the computer program 42 can be divided into a collection unit, a calculation unit, an extraction unit, and an inversion unit. A specific function of each unit is as follows:

a collection unit 31, applied to collecting surface wave data propagated from a seismic source through a wave detector at a preset station;

a calculation unit 32, applied to calculating and obtaining a dispersion energy graph, based on a vector wavenumber transform algorithm and the surface wave data;

an extraction unit 33, applied to extracting a dispersion curve from the dispersion energy graph, and the dispersion curve comprises a fundamental mode surface wave dispersion curve and a higher mode surface wave dispersion curve;

an inversion unit 34, applied to establishing an initial stratigraphic model according to the fundamental mode surface wave dispersion curve and the higher mode surface wave dispersion curve, and performing a joint inversion to the fundamental mode surface wave dispersion curve and the higher mode surface wave dispersion curve according to the initial stratigraphic model, before obtaining inversion data of the stratigraphic structure.

Alternatively, the calculation unit 32 comprises:

an extraction subunit, applied to extracting the seismic source time function from the surface wave data;

a first calculation subunit, applied to calculating the offset between the seismic source and the wave detector, and calculating the Green's function between the preset station and the seismic source according to the offset.

a second calculation subunit, applied to calculating and obtaining the dispersion energy graph according to the seismic source time function and the Green's function.

Alternatively, the second calculation subunit comprises:

a convolution module, applied to performing a convolution process to the seismic source time function and the Green's function, and obtaining vertical component data in a time domain of the surface wave data at the preset station;

a first conversion module, applied to performing a Fourier transform on the vertical component data in the time domain to obtain the vertical component data in a frequency domain:

a result module, applied to performing a vector wavenumber transformation on the vertical component data in the frequency domain and obtaining the dispersion energy graph.

Alternatively, the result module comprises:

a second transformation submodule, applied to performing a vector wavenumber transformation on the vertical component data in the frequency domain to obtain an intermediate calculation formula, after performing a vector wavenumber transformation on the vertical component data in the frequency domain and obtaining the dispersion energy graph;

a conversion submodule, applied to converting the intermediate calculation formula into a final calculation formula, based on an orthogonal nature of the Bessel function;

a calculation submodule, applied to calculating and obtaining the dispersion energy graph, based on the final calculation formula.

Wherein, the vertical component data in the time domain is:

$$u_z(x,t) = f_0(t) * g_{zz}(x,t)$$

wherein, $u_z(x, t)$ represents the vertical component data, $f_0$ represents the seismic source time function, $g_{zz}$ represents the Green's function.

The vertical component data in the frequency domain is:

$$U(r,\omega) = F_0(\omega) G(r,\omega)$$

Wherein, U represents the vertical component data in the frequency domain, $r = |\bar{r}|$ represents a distance between two observing stations (preset stations), ω represents an angular frequency, $\omega=2\pi f$, $f$ is the frequency, $F_0$ is the seismic source time function in the frequency domain, G is the Green's function in the frequency domain, $G(r, \omega)=\int_0^{+\infty} g(\omega, k) J_0(kr)kdk$, $g(\omega, k)$ is the kernel function, $k=|\vec{k}|$ is a wavenumber, $J_0(kr)$ is a first kind of Bessel function of zeroth order.

The intermediate calculation formula is:

$$\int_0^{+\infty} U(r,\omega) J_0(kr) r dr = F_0(\omega) \int_0^{+\infty} \int_0^{+\infty} g(\omega,k') J_0(kr) k' r dk' dr.$$

The final calculation formula is:

$$\int_0^{+\infty} U(r,\omega) J_0(kr) r dr = F_0(\omega) \cdot g(\omega,k);$$

wherein, $$g(k, \omega) \propto \frac{1}{\det\{I - \hat{R}_{du}^{(1)}(k, \omega) \hat{R}_{ud}^{(0)}(k, \omega)\}},$$

$R_{du}$ represents a reflection coefficient matrix of a downstream wave, $R_{ud}$ represents a reflection coefficient matrix of an upstream wave, I is a unit matrix, det{ } is a matrix determinant.

Alternatively, the inversion unit 34 comprises:

a classification subunit, applied to classifying the frequency ranges according to the energy distribution of the surface wave modes in each frequency range in the fundamental mode surface wave dispersion curve and the higher mode surface wave dispersion curve;

an establishing subunit, applied to establishing the initial stratigraphic model according to a correspondence relationship between the frequency ranges after classification and the stratum.

The terminal device 4 may be a computing device including a desktop computer, a laptop, a palmtop computer, a cloud server and more. The terminal device may comprise, but not limited to, a processor 40 and a memory 41. Those skilled in the art can understand that FIG. 4 is an example of the terminal device 4 only, instead of constituting a limitation on the terminal device 4. It may include more or less components than shown in the figure, or a combination of certain components, or different components. For example, the terminal device may further comprise an input and output device, a network access device, a bus, and more.

The processor 40 may be a Central Processing Unit (CPU), or a plurality of other general-purpose processors, Digital Signal Processors (DSP), Application Specific Integrated Circuit (ASIC), Field-Programmable Gate Array (FPGA), or other programmable logic devices, discrete gates or transistor logic devices, discrete hardware components, and more. The general-purpose processor can be a microprocessor or the processor can also be any conventional processors and more.

The memory 41 may be an internal storage unit of the terminal device 4, including a hard disk or an internal memory in the terminal device 4. The memory 41 may also be an external storage device of the terminal device 4, for example, a plug-in hard disk equipped in the terminal device 4, a Smart Media Card (SMC), or a Secure Digital (SD) Card, a Flash Card, and more. Further, the memory 41 may further comprise both an internal storage unit of the terminal device 4 and an external storage device. The memory 41 is applied to storing the computer program and a plurality of other programs and data required by the terminal device. The memory 41 can also be used to temporarily store a plurality of data that has been output or will be output.

In the embodiments described above, a description of each embodiment has an own focus thereof. For a plurality of parts that are not described in details or recorded in the embodiment, it is possible to refer to a plurality of related descriptions of other embodiments.

An ordinary skilled in the art may be aware that in a combination with the units and algorithm steps described in the embodiments disclosed herein, it is able to be implemented by an electronic hardware or a combination of a computer software and an electronic hardware. Whether the functions are performed by hardware or software depends on a specific application and a design constraint condition of a technical solution. Professionals and technicians in the art can use a plurality of different methods for each specific application to implement the functions described; such an implementation should not be considered beyond a scope of the present application.

In the embodiments provided in the present application, it should be understood that the device/terminal device and method disclosed may be implemented in a plurality of other ways. In an embodiment, the device/terminal device embodiments described above are merely illustrative, in an embodiment, the division of the modules or units is only a division of a logical function, and there may be other divisions in an actual implementation, such as a plurality of units, or components can be combined or integrated into another system, or some features can be omitted or not implemented. In addition, a mutual coupling or a direct coupling or a communication connection that displayed or discussed may be an indirect coupling or a communication connection through some interfaces, devices or units, and may be in an electrical, a mechanical or other forms.

The units described as separate components may or may not be physically separated, and the components displayed as a unit may or may not be a physical unit, that is, they may be located in one place, or they may be distributed on a plurality of network units. It is possible to choose some or all of the units according to an actual need to achieve the objective of the solutions of the embodiments.

In addition, the functional units in various embodiments of the present application may be integrated into one processing unit, or each unit may exist physically alone, or two or more units may be integrated into one unit. The integrated unit described above can be implemented in a form of hardware or in a form of software functional unit.

If the integrated module/unit is implemented in a form of the software functional unit and sold or used as an independent product, it can be stored in a computer readable storage medium. Based on such an understanding, all or part of the processes achieving the method described in the embodiments mentioned above in the present application, may also be achieved by a computer program instructing a plurality of relevant hardware. The computer program can be stored in a computer-readable storage medium, when the computer program is executed by the processor, it can implement the steps of the method in the embodiments. Wherein, the computer program comprises a computer program code, and the computer program code may be in a form of a source code, an object code, an executable file, or a certain intermediate forms and more. The computer-readable medium may comprise: any one entity or device capable of carrying the computer program code, a recording medium, a USB disk, a mobile hard disk, a magnetic disk, an optical disk, a computer memory, a Read-Only Memory (ROM), a Random Access Memory (RAM), an electric carrier signal, a telecommunication signal, a software distribution medium, and more. It should be noted that the content contained in the computer-readable medium can be appropriately added or deleted according to a plurality of requirements of a legislation and a patent practice in a jurisdiction. For example, in some jurisdictions, according to the legislation and a patent practice, the computer-readable medium does not comprise the electrical carrier signal and the telecommunication signals.

The embodiments described above are applied to illustrating, instead of limiting, the technical solutions of the present application only; although the present application has been described in details with reference to the embodiments described above, ordinary technical personnel in this field shall understand that: a plurality of modifications or equivalent substitutions of some of the technical features are still available, while all of these improvements or substitutions shall belong to a scope of protection in the appended claims of the present application.

What is claimed is:

1. An active source wave prospecting method, which comprises:
   collecting surface wave data propagated from a seismic source through a wave detector at a preset station;
   calculating and obtaining a dispersion energy graph, based on a vector wavenumber transform algorithm and the surface wave data;
   extracting a dispersion curve from the dispersion energy graph, which comprises a fundamental mode surface wave dispersion curve and a higher mode surface wave dispersion curve;
   establishing an initial stratigraphic model according to the fundamental mode surface wave dispersion curve and the higher mode surface wave dispersion curve, and performing a joint inversion to the fundamental mode surface wave dispersion curve and the higher mode surface wave dispersion curve according to the initial stratigraphic model, before obtaining an inversion data of the stratigraphic structure.

2. The active source surface wave prospecting method according to claim 1, wherein, the step of calculating and obtaining a dispersion energy graph, based on a vector wavenumber transform algorithm and the surface wave data, comprises:
   extracting a seismic source time function from the surface wave data;
   calculating an offset between the seismic source and the wave detector, and calculating a Green's function between the preset station and the seismic source according to the offset;
   calculating and obtaining the dispersion energy graph according to the seismic source time function and the Green's function.

3. The active source surface wave prospecting method according to claim 2, wherein, the step of calculating and obtaining the dispersion energy graph according to the seismic source time function and the Green's function, comprises:
   performing a convolution process to the seismic source time function and the Green's function, and obtaining a vertical component data in a time domain of the surface wave data at the preset station;
   performing a Fourier transform on the vertical component data in the time domain to obtain a vertical component data n a frequency domain;
   performing a vector wavenumber transformation on the vertical component data in the frequency domain to obtain the dispersion energy graph.

4. The active source surface wave prospecting method according to claim 3, wherein, the step of performing a vector wavenumber transformation on the vertical component data in the frequency domain to obtain the dispersion energy graph, further comprises:
   performing a vector wavenumber transformation on the vertical component data in the frequency domain to obtain an intermediate calculation formula;
   converting the intermediate calculation formula into a final calculation formula based on an orthogonal nature of the Bessel function;
   calculating and obtaining the dispersion energy graph based on the final calculation formula.

5. The active source surface wave prospecting method according to claim 4, wherein, the vertical component data in the time domain is:

$$u_z(x,t)=f_0(t)*g_{zz}(x,t),$$

wherein, $u_z(x, t)$ represents the vertical component data, $f_0$ represents the seismic source time function, $g_{zz}$ represents the Green's function;

the vertical component data in the frequency domain is:

$$U(r,\omega)=F_0(\omega)G(r,\omega),$$

herein, U represents the vertical component data in the frequency domain, $r=|\bar{r}|$ represents a distance between observing stations, $\omega$ represents an angular frequency, $\omega=2\pi f$, $f$ is a frequency, F is the seismic source time function in the frequency domain, G is the Green's function in the frequency domain, $G(r, \omega)=\int_0^{+\infty} g(k)J_0(kr)kdk$, $g(\omega, k)$ is a kernel function, $k=|\bar{k}|$ is a wavenumber, $J_0(kr)$ is a first kind of Bessel function of zeroth order;

the intermediate calculation formula is:

$$\int_0^{+\infty} U(r,\omega)J_0(kr)rdr=F(\omega)\int_0^{+\infty}\int_0^{+\infty} g(k,\omega)J_0(Kr)rKdKdr;$$

the final calculation formula is:

$$\int_0^{+\infty} U(r,\omega)J_0(kr)rdr=F(\omega)\cdot g(\omega,k);$$

wherein, $$g(k, \omega) \propto \frac{1}{\det\{I - \hat{R}_{du}^{(1)}(k, \omega)\hat{R}_{ud}^{(0)}(k, \omega)\}},$$

$R_{du}$ represents a reflection coefficient matrix of a downstream wave, $R_{ud}$ represents a reflection coefficient matrix of an upstream wave, I is a unit matrix, det{ } is a matrix determinant.

6. The active source surface wave prospecting method according to claim 1, wherein, the step of establishing an initial stratigraphic model according to the fundamental mode surface wave dispersion curve and the higher mode surface wave dispersion curve, comprises:
   classifying the frequency ranges according to the energy distribution of the surface wave modes in each frequency range in the fundamental mode surface wave dispersion curve and the higher mode surface wave dispersion curve;
   establishing the initial stratigraphic model according to a correspondence relationship between the frequency ranges after classification and the stratum.

7. A surface wave prospecting instrument, which comprises:
   a processor;

a memory coupled to the processor and storing a computer program that, when executed by the processor, causes the processor to:
collect surface wave data propagated from a seismic source through a wave detector at a preset station;
calculate and obtain a dispersion energy graph based on a vector wavenumber transform algorithm and the surface wave data;
extract a dispersion curve from the dispersion energy graph, which comprises a fundamental mode surface wave dispersion curve and a higher mode surface wave dispersion curve;
establish an initial stratigraphic model according to the fundamental mode surface wave dispersion curve and the higher mode surface wave dispersion curve, and performing a joint inversion to the fundamental mode surface wave dispersion curve and the higher mode surface wave dispersion curve according to the initial stratigraphic model, before obtaining inversion data of the stratigraphic structure.

8. The surface wave prospecting instrument according to claim 7, wherein, the computer program further causes the processor to:
extract the seismic source time function from the surface wave data;
calculate the offset between the seismic source and the wave detector, and calculate the Green's function between the preset station and the seismic source according to the offset;
calculate and obtain the dispersion energy graph according to the seismic source time function and the Green's function.

9. A non-transitory computer-readable storage medium storing a computer program that, when executed by a computer, causes the computer to:
collect surface wave data propagated from a seismic source through a wave detector at a preset station;
calculate and obtain a dispersion energy graph, based on a vector wavenumber transform algorithm and the surface wave data;
extract a dispersion curve from the dispersion energy graph, which comprises a fundamental surface wave dispersion curve and a higher mode surface wave dispersion curve;
establish an initial stratigraphic model according to the fundamental mode surface wave dispersion curve and the higher mode surface wave dispersion curve, and perform a joint inversion to the fundamental mode surface wave dispersion curve and the higher mode surface wave dispersion curve according to the initial stratigraphic model, before obtaining an inversion data of the stratigraphic structure.

10. The computer-readable storage medium according to claim 9, wherein, the computer program further causes the computer to:
extract a seismic source time function from the surface wave data;
calculate an offset between the seismic source and the wave detector, and calculate a Green's function between the preset station and the seismic source according to the offset;
calculate and obtain the dispersion energy graph according to the seismic source time function and the Green's function.

11. The computer-readable storage medium according to claim 10, wherein, the computer program further causes the computer to:

perform a convolution process to the seismic source time function and the Green's function, and obtain a vertical component data in a time domain of the surface wave data at the preset station;
perform a Fourier transform on the vertical component data in the time domain to obtain a vertical component data in a frequency domain;
perform a vector wavenumber transformation on the vertical component data in the frequency domain to obtain the dispersion energy graph.

12. The computer-readable storage medium according to claim 11, wherein, the computer program further causes the computer to:
perform a vector wavenumber transformation on the vertical component data in the frequency domain to obtain an intermediate calculation formula;
convert the intermediate calculation formula into a final calculation formula based on an orthogonal nature of the Bessel function;
calculate and obtain the dispersion energy graph based on the final calculation formula.

13. The computer-readable storage medium according to claim 12, wherein, the vertical component data in the time domain is:

$$u_z(x,t)=f_0(t)*g_{zz}(x,t),$$

wherein, $u_z(x, t)$ represents the vertical component data, $f_0$ represents the seismic source time function, $g_{zz}$ represents the Green's function;
the vertical component data in the frequency domain is:

$$U(r,\omega)=F_0(\omega)G(r,\omega),$$

wherein, U represents the vertical component data in the frequency domain, $r=|\bar{r}|$ represents a distance between two observing stations, $\omega$ represents an angular frequency, $\omega=2\pi f$, $f$ is a frequency, F is the seismic source time function in the frequency domain, G is the Green's function in the frequency domain, $G(r,\omega)=\int_0^{+\infty}g(\omega, k)J_0(kr)kdk$, $g(\omega, k)$ is a kernel function, $k=|\bar{k}|$ is a wavenumber, $J_0(kr)$ is a first kind of Bessel function of zeroth order;
the intermediate calculation formula is:

$$\int_0^{+\infty}(r,\omega)J_0(kr)rdr=F(\omega)\int_0^{+\infty}\int_0^{+\infty}g(k,\omega)J_0(Kr)rKdKdr;$$

the final calculation formula is:

$$\int_0^{+\infty}U(r,\omega)J_0(kr)rdr=F(\omega)\cdot g(\omega,k);$$

wherein, $$g(k,\omega) \propto \frac{1}{\det\{I-\hat{R}_{du}^{(1)}(k,\omega)\hat{R}_{ud}^{(0)}(k,\omega)\}},$$

$R_{du}$ represents a reflection coefficient matrix of a downstream wave, $R_{ud}$ represents a reflection coefficient matrix of an upstream wave, I is a unit matrix, det{ } is a matrix determinant.

14. The computer-readable storage medium according to claim 9, wherein, the computer program further causes the computer to:
classify the frequency ranges according to the energy distribution of the surface wave modes in each frequency range in the fundamental mode surface wave dispersion curve and the higher mode surface wave dispersion curve;

establish the initial stratigraphic model according to a correspondence relationship between the frequency ranges after classification and the stratum.

\* \* \* \* \*